United States Patent [19]

Baumann et al.

[11] Patent Number: 4,460,130
[45] Date of Patent: Jul. 17, 1984

[54] HIGH TEMPERATURE GAS DISTRIBUTION INJECTOR

[75] Inventors: George P. Baumann, Sparta; James A. Zboray, Randolph, both of N.J.

[73] Assignee: Exxon Research and Engineering Co., Florham Park, N.J.

[21] Appl. No.: 105,956

[22] Filed: Dec. 21, 1979

[51] Int. Cl.³ .............................................. B05B 1/14
[52] U.S. Cl. ................................... 239/559; 201/41; 202/239; 202/270; 239/591; 239/596; 239/601; 422/143; 422/310
[58] Field of Search ............... 239/550, 558, 559, 567, 239/591, 596, 600, 601, 602, DIG. 19; 366/101, 107; 34/57 A, 57 B; 422/139, 143, 198, 204, 310, 311; 208/163; 201/41; 202/239, 270; 222/591; 432/58

[56] References Cited

U.S. PATENT DOCUMENTS

| 3,053,642 | 9/1962 | Huntley et al. | 422/143 |
| 3,508,341 | 4/1970 | Price | 34/57 A |
| 3,510,065 | 5/1970 | Gigantino et al. | 238/601 X |
| 3,565,593 | 2/1971 | Moore, Jr. | 34/57 A |
| 3,717,438 | 2/1973 | Schmalfeld et al. | |
| 3,974,091 | 8/1976 | Parker et al. | 34/57 A |
| 4,062,656 | 12/1977 | Blaser et al. | 34/57 A |
| 4,223,843 | 9/1980 | Smith et al. | 34/57 A |

FOREIGN PATENT DOCUMENTS 851932 8/1977 Belgium .
7000853 9/1970 Netherlands .

Primary Examiner—Jeffrey V. Nase
Attorney, Agent, or Firm—Edward H. Mazer

[57] ABSTRACT

An injector for a high temperature gas distribution means comprising a distribution manifold having a heat-resistant lining with a central passage therethrough, and a refractory-lined injector communicating with the distribution manifold. The injector includes a nozzle disposed external to the manifold having a central opening and an inlet extending from the nozzle to the central passage. The cross-sectional area of the central opening in the nozzle in the direction of flow is smaller at least at one point than that of the inlet such that a major portion of the pressure drop in the gas flowing from the central passage through the inlet and the nozzle is created by the nozzle. By disposing the nozzle external to the distribution manifold, the flow rate of gas through cracks in the heat resistant manifold lining is minimized.

11 Claims, 2 Drawing Figures

HIGH TEMPERATURE GAS DISTRIBUTION INJECTOR

BACKGROUND OF THE INVENTION

1. Field of the Invention

This invention relates to injectors for gas distributors. More particularly, this invention is concerned with refractory-lined gas distributor injectors for high temperature environments.

2. Description of the Prior Art

In high temperature gas distribution systems, such as ceramic-lined gas distributors disposed in process vessels, the gas normally is discharged through a series of injectors. In certain applications, such as distributors for heating zones in fluidized bed coking units, the fluidized bed may be of large diameter, frequently 40 feet or more, necessitating large diameter distributors 4 feet or more in inside diameter. During the heating and cooling cycles, the ceramic refractory lining often develops cracks and may separate slightly from the steel outer surface. In certain embodiments where the distributor includes a nozzle recessed in the inner surface of the ceramic lining, a portion of the gas may by-pass the injector, flow through the cracks and then pass between the refractory and the steel outer surface adversely affecting the gas distribution. Moreover, where the gas is hot and/or contains corrosive compounds such as hydrogen sulfide and carbonyl sulfide, excessive corrosion of the outer surface may be experienced. In addition, in these embodiments a large section of the gas distributor often must be cut away to replace eroded nozzles.

The subject invention is directed at relatively inexpensive, easily repairable injectors for a high temperature gas distribution means in which the pressure drop is taken external to the distribution manifold to greatly decrease the pressure differential across the manifold and thereby minimize or eliminate gas flow through the refractory cracks.

SUMMARY OF THE INVENTION

This invention is directed at an injector for a high temperature gas distribution means having a distribution manifold communicating with a gas source and with the injector. This distribution manifold includes a circumferential heat-resistant lining having a central passage therethrough. The injector comprises:

(a) an inlet extending from the central passage through the heat resistant manifold lining to a nozzle disposed external to the manifold lining; and, (b) a nozzle disposed external to the manifold lining with an opening therethrough having at least one point at which the cross-section area of the opening in the direction of flow is smaller than that of the inlet, whereby a major portion of the pressure drop of the gas passing from the central passage through the inlet and the nozzle is created by the nozzle.

DETAILED DESCRIPTION OF THE PREFERRED EMBODIMENT

Figure 1:
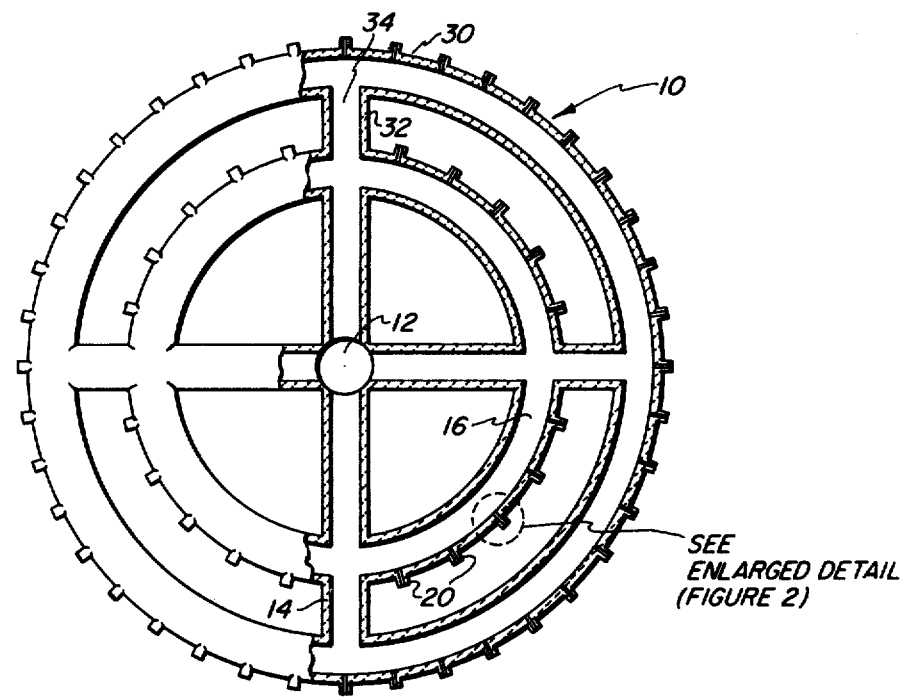
FIG. 1 is a simplified bottom plan view of a gas distribution means incorporating the injector of the subject invention with a portion of the outer surface broken away to show the internal construction.

Referring to FIG. 1, the bottom surface of a simplified gas distribution means, such as gas distributor 10, is shown having a distribution manifold comprising a central feed inlet 12 communicating with a gas source, and a plurality of radially spaced-apart spokes 14 extending from inlet 12 interconnected by a series of curvilinear sections 16. While distributor 10 is shown having two series of curvilinear sections 16, in practice, distributors frequently have additional series of spaced-apart curvilinear sections located at varying radii from inlet 12, the diameters of the curvilinear sections varying to maintain the gas velocities within the preferred range. Spokes 14 and curvilinear sections 16 are shown having an outer metal housing 30, and a circumfential heat resistant lining, such as refractory lining 32 disposed within housing 30 circumferentially surrounding central passage 34. Housing 30 and refractory lining 32 may be constructed of any materials which will have satisfactory chemical and thermal resistance at the operating temperatures in the fluid bed. Refractory lining 32 protects housing 30 from thermal or chemical attack by the gas mixture before it reaches the fluid bed. Injector means, such as injectors 20, described in more detail hereinafter, may be disposed on curvilinear section 16 in any manner which will disperse the gas substantially uniformly in the vessel (not shown). It has been found that the gas is distributed more evenly and the pressure drop required for satisfactory gas distribution is lower when injectors 20 discharge in a somewhat downwardly direction than when the injectors discharge horizontally or upwardly. In practice, injectors 20 frequently are disposed downwardly at an angle of about 45 to about 90 degrees from the horizontal. The injector dimensions and spacing will be a function of several variables including the uniformity of gas distribution desired, gas distributor design, gas discharge velocity, vessel dimensions, and vessel contents.

Figure 2:
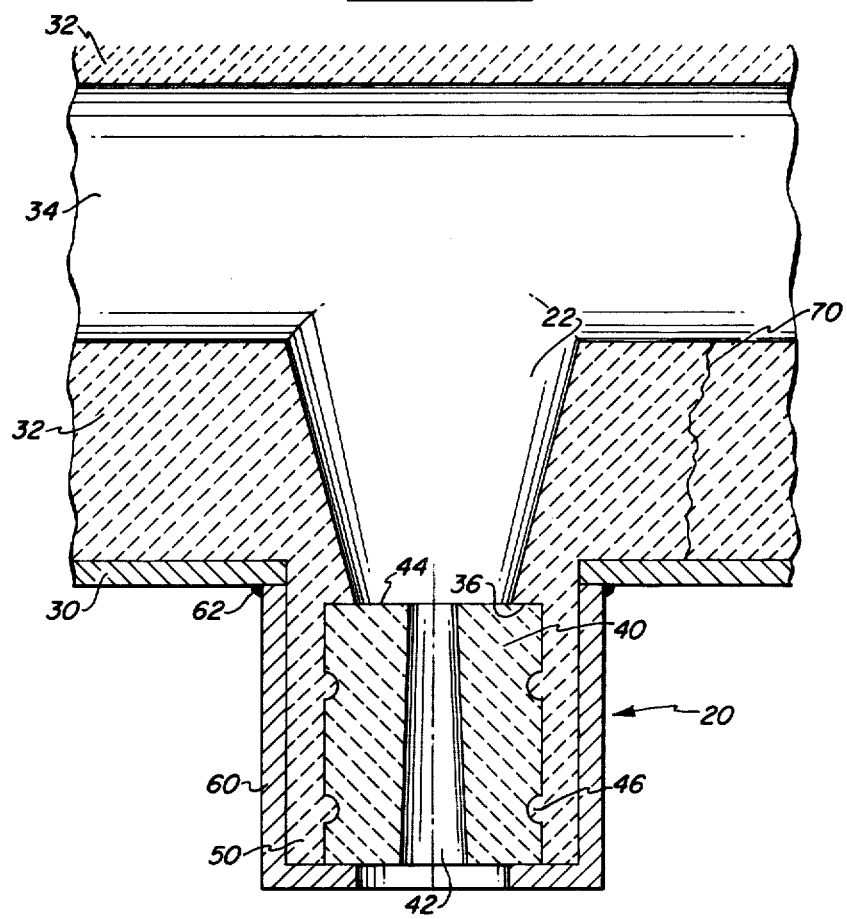
FIG. 2 is an enlarged detail of the encircled section of FIG. 1.

Referring to FIG. 2, an enlarged section of the detail in FIG. 1 is shown. Injector 20 is shown having inlet 22 extending from central passage 34 through refractory lining 32 and outer housing 30, the inlet communicating with central opening 42 through nozzle 40. To impart increased erosion resistance, particularly if fine solid materials are present in the gas being distributed, nozzle 40 normally is constructed of a more dense refractory-type material than the heat resistant material circumferentially surrounding the nozzle, such as refractory 50. It is within the contemplation of this invention, however, that nozzle 40 may be refractory and that nozzle 40 and refractory 50 could be formed as an integral element having a uniform composition. In the embodiment shown, nozzle outer surface 60, disposed in surrounding relationship to refractory 50, is shown welded at 62 to housing 30. Nozzle 40 is shown with anchoring means comprising a plurality of peripheral indentations 46 which serve to further retain the nozzle in refractory 50. Other protrusions or indentation designs may also prove satisfactory in further anchoring nozzle 40 in refractory 50. However, identations or protrusions in nozzle 40 are not essential to the successful practice of this invention. Inlet 22 is shown generally frusto-conical to permit surface 44 of nozzle 40 to be further supported by shoulder 36 of refractory lining 32. Other designs for inlet 22 and nozzle 40 also may prove satisfactory provided that central opening 42 through nozzle 40 has at least one point at which the cross sectional area in the direction of flow is less than the cross-sectional area of the inlet such that a major portion of the pressure drop of the gas passing from the central passage through the inlet and the nozzle is created by the nozzle external to refractory lining 32. If substantially all of the pressure drop were taken by placing the nozzle at the inner surface of the refractory adjacent to central passage 34, as is done in the prior art, rather than external to refractory lining 32 as shown, there would be a driving force permitting some of the gas to by-pass the nozzle by flowing through cracks 70 and travel between refractory lining 32, and housing 30 to central opening 42. At high temperatures, compounds in the gas, particularly sulfidic compounds, would cause excessive rates of corrosion to housing 30.

Central opening 42 of nozzle 40 is shown outwardly diverging from curvilinear section 16, to decrease the exit velocity of the gas and improve the exit gas distribution while also lowering the attrition rate of the fluidized solids. The angle of divergence of opening 42 with respect to a center line in the direction of flow should be maintained less than 15°, since, at greater angles, the gas tends not to travel along the wall of the opening thereby causing high velocity jetting into the fluidized bed with resulting high solids attrition. Furthermore, at angles greater than 15° turbulent eddy currents are established along the wall which can draw solids from the bed into the injector leading to erosion of the interior portion of the injector.

Replacement of eroded or damaged nozzles 40 is relatively straight-forward using the subject invention. Outer housing 60, and refractory 50 are cut off to remove the eroded nozzle. A new section including a new nozzle 40, refractory 50 and outer surface 60 is affixed by joining refractories 32 and 50 using an appropriate adhesive material and by re-welding outer surface 60 to housing 30 at 62. By comparison in prior art systems where the nozzle is located adjacent to central passage 34, it is necessary to remove a relatively large section of housing 30 and refractory lining 32 to effectuate the nozzle replacement.

In a typical application in a heating vessel for a fluid coking system, curvilinear sections 16 typically are four feet or more in diameter. To provide satisfactory chemical and temperature resistance to the gas, which includes, CO, $CO_2$, COS, $H_2S$ and $H_2O$ at up to 1800° F. and about 35 psig, refractory lining 32 normally comprises 4 inches of castable metal fiber reinforced refractory of about 120–139 pounds per cubic foot density containing at least 53 wt. % $Al_2O_3$, while housing 30 comprises ⅜–1 inch of type 18-8 or 310S stainless steel. Nozzle 40 comprises a 2 7/32 inch inside diameter inlet and 2 7/16 inch inside diameter outlet retained within refractory 50, nozzle 40 comprising a material such as Durafrax 1542, a commercially available erosion resistant refractory manufactured by Carborundum Co. comprising at least 96 wt. % $Al_2O_3$. Refractory 50 typically may be 6 inches in diameter, 5 ½ inches in length being disposed within outer surface 60, comprising an 8 inch standard weight pipe section of type 18-8 or 310S stainless steel approximately 6 inches in length welded to housing 30 at 62 by conventional techniques. Distributor 10 typically includes a plurality of curvilinear sections 16 with the centerline spacing between adjacent injectors 20 being as close as 10 inches. Utilizing the subject design in a heating vessel for a fluid-coking system, the inlet nozzle pressure is approximately 35.5 PSIG, the outlet pressure about 34 PSIG, and the exit velocity about 300 ft./sec. Higher velocities would cause excessive erosion of the coke particles in the vessel, while lower velocities would result in substantially poorer gas distribution.

Injector 20 may be shop fabricated by installing nozzle 40 with a plug to maintain position while filling the annular void with refractory 50, such as Resco RS-17A, a commercially available product manufactured by Resco Products, Inc., which comprises 93 wt.% $Al_2O_3$ and metal fibers. Similarly, plugs can be placed in spokes 14 and curvilinear sections 16 to define central passage 34 and inlet 22 while a refractory, such as Resco-17E, a commercially available refractory comprising 53 wt.% $Al_2O_3$ and metal fibers is cast to form refractory lining 32. Refractories 50 and 32 are covered and dried for about 18 hours at 105° C. after which the plugs are removed. After inspection and testing, injectors 20 are welded to curvilinear sections 16 at joints 62 and refractories are joined by "buttering" using a refractory such as Resco 17E. In a similar manner, curvilinear section 16, spokes 14 and inlet 12 subsequently are joined together in place to form the gas distribution means.

Although the subject process has been described with reference to a specific embodiment, it will be understood that it is applicable to other uses, where it is necessary to distribute a high temperature or highly corrosive gas to a fluidized bed. Any variations, uses or adaptations of the invention following, in general, the principles of the invention are intended to be covered, including such departures from the present disclosure as come within the scope of the invention.

What is claimed is:

1. A gas distribution means of the type having a distribution manifold communicating with a gas source and with an injector, the manifold having a circumferential heat-resistant lining and a central passage therethrough, the improvement wherein said injector comprises:
   a frusto-conical inlet extending from the central passage through the heat resistant lining; and
   an outwardly directed nozzle disposed external to the lining, said nozzle communicating with said inlet and having an opening therethrough with at least one point at which the cross-sectional area of the opening in the direction of flow is less than that of the inlet said nozzle adapted to create at least a major portion of the pressure drop of the gas passing from the central passage through said inlet and said nozzle.

2. The distribution means of claim 1 further comprising a heat-resistant lining circumferentially surrounding said nozzle.

3. The distribution means of claim 2 wherein said heat-resistant lining circumferentially surrounding said nozzle is a refractory.

4. The distribution means of claim 3 wherein the wall formed by the opening in said nozzle has an outwardly diverging angle of less than 15 degrees with respect to a centerline through the opening in the direction of gas flow.

5. The distribution means of claim 4 wherein said nozzle further includes anchoring means adapted to further retain said nozzle in said refractory circumferentially surrounding said nozzle.

6. The distribution means of claim 1 wherein said nozzle is a refractory.

7. A high temperature gas distribution means comprising:
   a distribution manifold communicating with a gas source and with an injector, the manifold having a heat resistant refractory lining and a central passage therethrough; and
   an injector communiating with said distribution manifold, said injector comprising: (i) a frusto-conical inlet extending from the central passage through said manifold refractory lining; (ii) a refractory nozzle disposed external to said manifold lining directly communicating with said inlet, said nozzle having an opening therethrough, the opening having at least one point at which the cross-sectional area in the direction of flow is less than that of the inlet; and (iii) a refractory lining circumferentially disposed around said nozzle, said nozzle adapted to create at least a major portion of the pressure drop of the gas passing from the central passage through said inlet and said nozzle.

8. A gas distribution means of the type having a distribution manifold communicating with a gas source and with an injector, the manifold having a circumferential heat-resistant lining and a central passage therethrough, the improvement wherein said injector comprises:
   (a) a frusto-conical inlet extending from the central passge;
   (b) an outwardly directed nozzle disposed external to the lining communicating with said inlet, said nozzle having an opening therethrough having at least one point at which the cross-sectional area of the opening in the direction of flow is less than that of the inlet, said nozzle adapted to create at least a major portion of the pressure drop of the gas passing from the central passage through said inlet and said nozzle.

9. The gas distribution means of claim 8 further comprising a heat-resistant lining circumferentially surrounding said nozzle.

10. The gas distribution means of claim 9 wherein said heat resistant manifold lining and said heat resistant lining circumferentially surrounding said nozzle are integral.

11. The gas distribution means of claim 10 wherein the inlet is substantially frusto-conical.

* * * * *